(12) United States Patent
Amrany et al.

(10) Patent No.: US 6,219,386 B1
(45) Date of Patent: Apr. 17, 2001

(54) FRAMELESS REED-SOLOMON CODING SYSTEM AND METHOD

(75) Inventors: Daniel Amrany, Ocean Township; Xian-Ying Chen, Matawan; Ehud Langberg, Ocean Township; William Scholtz, Middletown, all of NJ (US)

(73) Assignee: Globespan, Inc., Redbank, NJ (US)

(*) Notice: Subject to any disclaimer, the term of this patent is extended or adjusted under 35 U.S.C. 154(b) by 0 days.

(21) Appl. No.: 09/113,468

(22) Filed: Jul. 10, 1998

Related U.S. Application Data

(60) Provisional application No. 60/053,204, filed on Jul. 21, 1997.

(51) Int. Cl.[7] .......................... H04L 23/02; H04L 27/36; H04L 27/22; H04L 7/00
(52) U.S. Cl. .......................... 375/261; 375/298; 375/332; 375/354
(58) Field of Search .................................. 375/259, 261, 375/262, 269, 271, 279, 280, 281, 295, 298, 302, 316, 322, 324, 329, 332, 340, 341, 354, 357, 359, 377; 714/784; 332/103; 329/304

(56) References Cited

U.S. PATENT DOCUMENTS

| 5,363,408 | 11/1994 | Paik et al. ............................. 375/39 |
| 5,511,096 | 4/1996 | Huang et al. ......................... 375/265 |
| 5,583,889 | * 12/1996 | Citta et al. ............................ 375/341 |
| 5,659,578 | 8/1997 | Alamouti et al. ..................... 375/261 |
| 5,835,165 | * 11/1998 | Keate et al. ....................... 348/845.1 |

* cited by examiner

*Primary Examiner*—Stephen Chin
*Assistant Examiner*—Betsy L. Deppe
(74) *Attorney, Agent, or Firm*—Thomas, Kayden, Horstemeyer & Risley (57) ABSTRACT

An improvement to a Reed Solomon (RS) coding scheme wherein the RS encoder and decoder is initiated based upon counting a number of timing, baud, or byte cycles from a known time stamp. The time stamp can be for example, a Tomlinson coefficient exchange frame whereby at the end of a Tomlinson coefficient exchange frame, a counter in both transmitter and receiver is actuated to begin counting a number of baud cycles. Alternatively, the counter may be initiated upon the receipt of a particular byte. Once the appropriate number of baud cycles or bytes have elapsed, the RS encoder and decoder will begin operation, thus ensuring that both RS encoding and decoding occur at the proper time, without the use of any additional framing bits.

25 Claims, 6 Drawing Sheets

FRAMELESS REED-SOLOMON CODING SYSTEM AND METHOD

CROSS REFERENCE TO RELATED APPLICATION

This application claims the priority benefit of U.S. provisional application entitled RADSL TRANSCEIVER FRAMELESS REED-SOLOMON CODING SYSTEM AND METHOD, assigned Ser. No. 60/053,204, filed Jul. 21, 1997 and is hereby incorporated by reference.

FIELD OF THE INVENTION

The present invention relates generally to data communications, and more particularly, to a system and method for forward error correction using frameless Reed-Solomon coding.

BACKGROUND OF THE INVENTION

The field of data communications typically uses transceivers, or modems, to convey information from one location to another. Digital Subscriber Line (DSL) technology now enables transceivers to communicate rapidly large amounts of data. Transceivers communicate by modulating a baseband signal carrying digital data, converting the modulated digital data signal to an analog signal, and transmitting the analog signal over a conventional wire using techniques that are known in the art. These known techniques include mapping the information to be transmitted into a signal space constellation and slicing the received constellation to recover the transmitted information. The constellation can include both analog and digital information or only digital information.

In the above mentioned communications environment, it is possible that some of the transmitted information could be lost or corrupted. In that event, it is desirable to have a means for error detection and correction. Forward error correction is one well known method of achieving error detection and correction. Error correction codes can be, for example, block codes, cyclic codes, convolutional codes and Viterbi codes.

Reed-Solomon (RS) coding is a widely used cyclic, block coding scheme, particularly suited to demanding applications such as terrestrial broadcasting of digital television, deep space communications, compact disk storage, and data communications over terrestrial lines. RS codes are multilevel codes where the code words are constructed from symbols from a Galios (finite) Field. The code words have the property that is 2 t parity symbols are added to each data word to form a code word, then the code can find and correct up to any t lost symbols. Conventional RS coding requires the use of in-band framing bytes added to the code in order to insure alignment of the RS frame. One of the drawbacks of the aforementioned technique is that the use of in-band framing is wasteful of bandwidth and requires additional circuitry.

Thus, it would be desirable to develop a system in which RS forward error correction may be employed without the need of transmitting additional framing bytes.

SUMMARY OF THE INVENTION

The present invention provides an improvement to Reed-Solomon (RS) coding by allowing a transceiver to send and receive RS encoded frames without the need to send additional framing bytes. This is accomplished by providing a system for data communications comprising a Reed-Solomon (RS) encoder and a counter configured to enable the RS encoder to encode data without the use of framing bits. This task is accomplished by counting a number of timing (or baud) cycles from the end of a pre-existing time stamp and then starting the RS encoder and decoder. The time stamp can be, for example, a Tomlinson exchange frame as is known in the art of data communications, However, any method of determining a suitable place to begin counting the baud cycles can be used to practice the concept of the invention.

For example, a full bandwidth pattern of all ones can be sent, thus signaling the receiver to synchronize on that fill bandwidth pattern and begin RS encoding/decoding. Also included is a mapper designed to map the data into a signal space constellation and a transmitter designed to transmit the signal space constellation.

The system also includes a receiver designed to receive the signal space constellation and a Viterbi decoder and demapper designed to recover the data from the signal space constellation. A Reed-Solomon (RS) decoder configured to decode the data without the use of framing bits by using a counter similar to that described with respect to the encoder is also included. Similarly, the counter is configured to enable the RS decoder to decode the data without the use of framing bits by counting a number of timing cycles from the pre-existing time stamp prior to starting the decoder. Optionally a scrambler and descrambler can be included in order to supply data in a scrambled format. The present invention also enables the devices equipped therewith to maintain synchronization in the event of a signal interruption by employing an equalizer in the receiver, the equalizer designed to cooperate with the counter.

The present invention can also be conceptualized as a method for data communications comprising the steps of supplying data to a Reed-Solomon (RS) encoder and counting a number of timing cycles prior to engaging the RS encoder in order to encode the data without the use of framing bits. The signal is then mapped into a signal space constellation and transmitted over a communication channel. At a receiver, the signal space constellation is received and demapped in order to recover the original data. Prior to engaging a RS decoder a number of timing cycles are counted in order to enable the RS decoder to decode the data without the use of framing bits.

The invention has numerous advantages, a few of which are delineated hereafter, as merely examples.

An advantage of the present invention is that it eliminates the need to send additional framing bytes with the Reed-Solomon frame, thus conserving system resources.

Another advantage of the present invention is that the need for frame synchronizing circuitry in data mode is eliminated.

Another advantage of the present invention is that it is simple in design, reliable in operation, and its design lends itself to economical mass production in modems.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings. The components within the drawings are not necessarily to scale relative to each another, emphasis instead being placed on clearly illustrating the principles of the present invention.

FIG. 1 is a schematic view illustrating a communications environment in which communication devices employing the frameless Reed-Solomon encoding and decoding logic operate;

DETAILED DESCRIPTION OF THE PREFERRED EMBODIMENT

The present invention can be implemented in software, hardware, or a combination thereof. In the preferred embodiment, the elements of the present invention are implemented in software that is stored in a memory and that configures and drives a suitable digital signal processor (DSP) situated in a transceiver; and in hardware as a counter. The counter may alternatively be implemented in software. However, the foregoing software can be stored on any computer-readable medium for transport or for use by or in connection with any suitable computer-related system or method. In the context of this document, a computer-readable medium is an electronic, magnetic, optical, or other physical device or means that can contain or store a computer program for use by or in connection with a computer-related system or method.

While the foregoing preferred embodiment illustrates the invention in the context of a digital subscriber line (DSL) transceiver, the features of the present invention are applicable to any device making use of Reed-Solomon forward error correction. Furthermore, the discussion of the preferred embodiment shows a single DSL commnunications device having both a transmitter and receiver for practicing the concepts of the present invention, essentially showing the operation of the present invention in both transmit and receive directions. However, in practice, the present invention is equally applicable to implementation in only one direction. For example, a DSL communication device located at a telephone company central office can perform RS encoding while the DSL device at a customer premise can perform the RS decoding, i.e., in only the downstream direction. Similarly, RS coding can be performed in only the upstream (customer premise to central office) with equal effectiveness.

Figure 1:
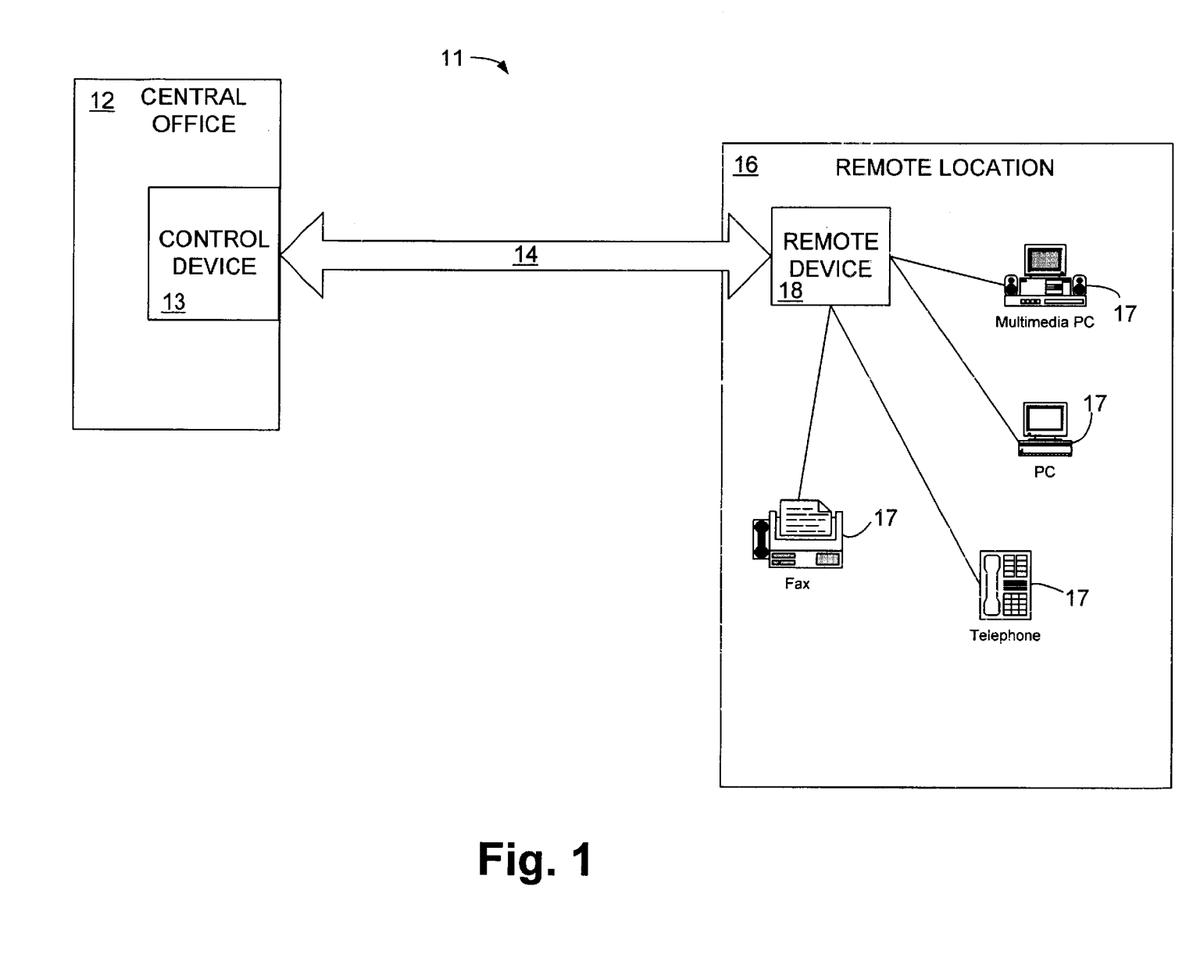

FIG. 1 is a schematic view illustrating a communications environment 11 in which devices employing the Reed-Solomon encoder and decoder logic of the present invention operate. Remote location 16 is connected to central office location 12 via communication channel 14. Located at central office location 12 is control device 13. Communication channel 14 is typically the copper wire that extends between a telephone company central office and a remote residential, business, or any other location served by local telephone service. Remote location 16 may contain a remote DSL device 18 connecting a plurality of user devices 17 to communication channel 14. By using control device 13 and remote device 18 employing the Reed-Solomon encoder and decoder logic, it is possible for control device 13 and remote device 18 to maintain timing and synchronization without the use of framing bits. The present invention resides both in control device 13 and remote device 18, and can be employed by both devices.

Figure 2:
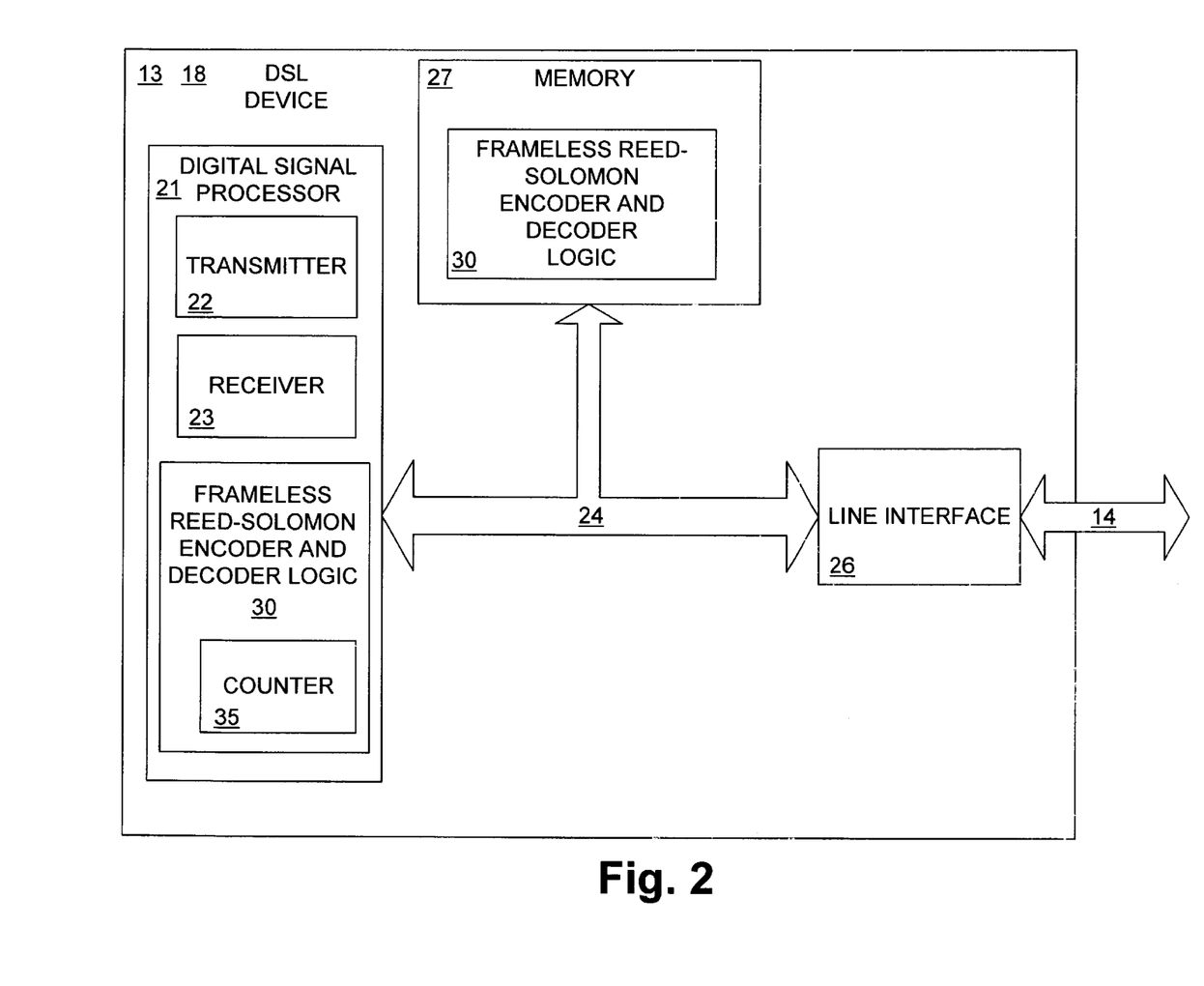
FIG. 2 is a block diagram illustrating a communications device of FIG. 1 including the Reed-Solomon encoder and decoder logic of the present invention.

FIG. 2 shows a block diagram illustrating either control device 13 and remote device 18 of FIG. 1 including the Reed-Solomon encoder and decoder logic 30 of the present invention. Because the present invention may reside in both control device 13 and remote device 18, the discussion of the operation of the invention with respect to remote device 18 is equally applicable to control device 13.

Still referring to FIG. 2, both control device 13 and remote device 18 contain conventional components as is known in the art of data communications. Digital Signal Processor (DSP) 21 controls the operation of the devices' transmitter 22 and receiver 23, and couples to line interface 26 over communication bus 24 to gain access to communications channel 14. Also included in DSP 21 is the frameless Reed-Solomon encoder and decoder logic 30 of the present invention. Included in the frameless Reed Solomon encoder logic 30 is counter 35. Once enabled by the frameless Reed-Solomon encoder logic 30, counter 35 counts a predetermined number of baud, or timing cycles in order to allow both transmitter and receiver to achieve timing synchronization and will be discussed in detail with reference to FIG. 4. Because the Reed-Solomon encoder and decoder logic 30 is an algorithm that is executed on a suitable processor, such as DSP 21, it is also depicted as residing within memory 27. While in a preferred embodiment, the present invention is an algorithm that is executed in DSP 21, for simplicity, the Reed Solomon encoder and decoder logic 30 will be described with reference to discrete blocks in FIG. 3.

Figure 3:
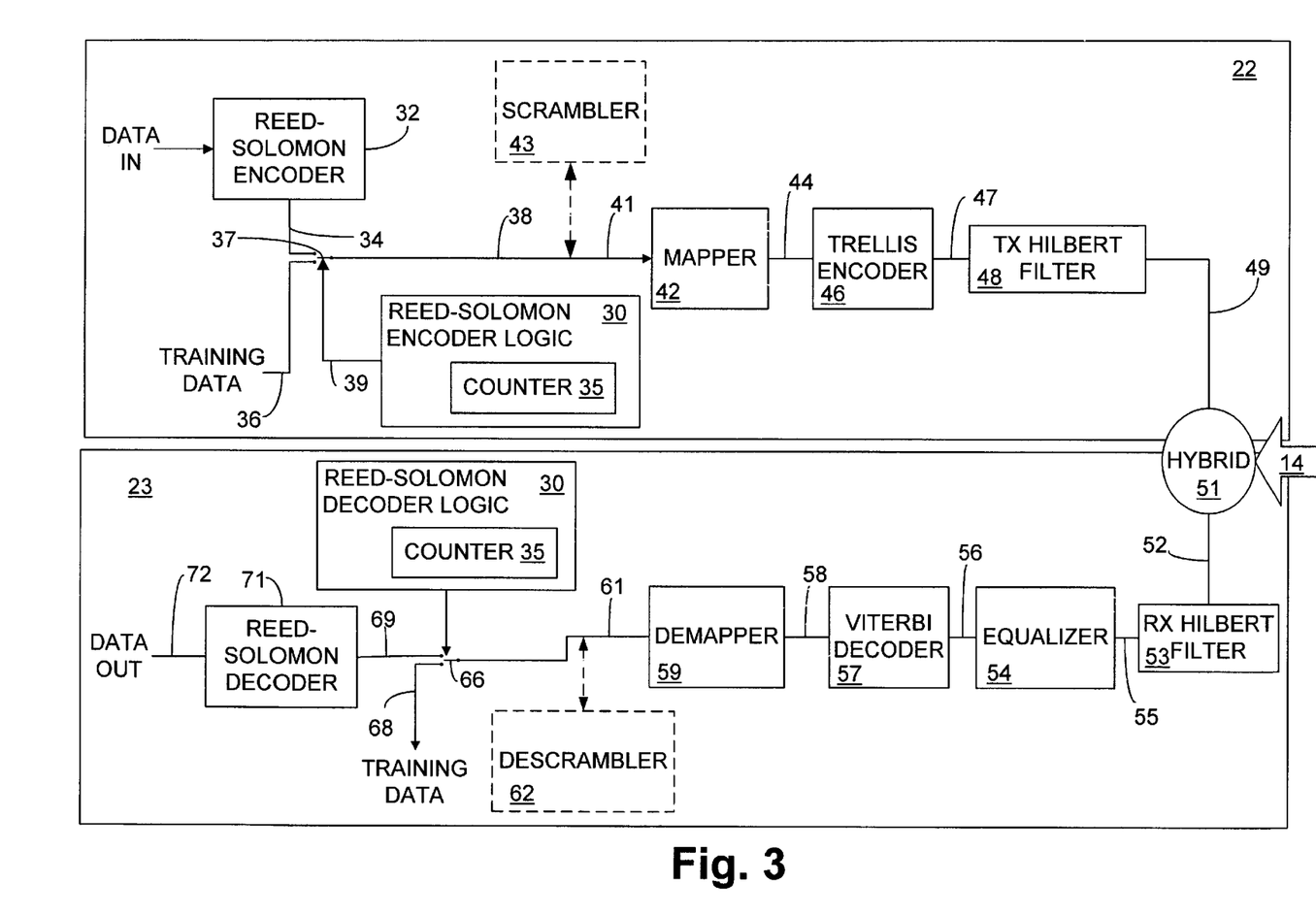
FIG. 3 is a block diagram illustrating the transmitter and receiver of FIG. 2 including the frameless Reed-Solomon encoder and decoder logic of the present invention.

With reference now to FIG. 3, shown is a block diagram illustrating the transmitter 22 and receiver 23 of the communication device of FIG. 2 including the frameless Reed-Solomon encoding and decoding logic 30 of the present invention.

During an initialization, or training phase of a connection, training data is supplied on line 36 to switch 37. The operation of switch 37 is controlled by a signal on line 39 supplied by the frameless Reed-Solomon encoder and decoder logic 30 of the present invention. During the training phase, Reed-Solomon encoder logic 30 maintains switch 37 in position to receive only training data on line 38, while during the data transfer phase Reed-Solomon encoder logic 30 maintains switch 37 in position to pass data to line 38 after encoding by Reed-Solomon encoder 32. Reed-Solomon encoder logic 30 will be discussed in detail below with reference to FIGS. 4, 5 and 6.

Either customer data or training data is input on line 38 to optional scrambler 43 which, if employed, scrambles the data as is known in the art. If employed, scrambler 43 supplies on line 41 a scrambled signal to mapper 42 which maps the signal into a signal space constellation as will be appreciated by those skilled in the art. Mapper 42 supplies the signal space constellation on line 44 to trellis encoder 46 for trellis encoding as is known in the art. The encoded signal space constellation is then supplied on line 47 to TX Hilbert filter 48 for transmission through hybrid 51 on line 49 and onto communication channel 14. TX Hilbert filter 48 is used to modulate the signal using multidimension carrierless amplitude/phase (CAP) modulation. Alternatively, the output of encoder 46 can be modulated using other types of modulators. For example, for single dimension communication such as 2-D CAP, a transmit filter pair could be employed with one transmit filter having the Hilbert characteristic of the other. Additionally, the present invention is equally applicable to quadrature amplitude modulation (QAM) as is known in the art, or many other modulation schemes.

Reed-Solomon encoder logic 30 is designed to control switch 37 in such a way as to allow Reed-Solomon encoder 32 to begin sending RS encoded customer data to line 38 at a known time, such as after receipt of a time stamp. A suitable time stamp can be for example, at the end of training where options, status, and Tomlinson coefficients are exchanged. Because this exchange is handled in symbol boundaries, it can be used as an exact time stamp. Reed-Solomon encoder logic 30 includes counter 35 to enable the counting of baud, or timing, cycles after receipt of a time stamp. The timing of Reed-Solomon encoder logic will be discussed in detail with respect to FIG. 4.

Still referring to FIG. 3 and with particular regard to receiver 23, a receive signal is supplied from hybrid 51 on line 52 to RX Hilbert filter 53. RX Hilbert filter 53 performs the inverse operation as that of TX Hilbert filter 48 as known in the art. The output of RX Hilbert filter 53 is supplied on line 55 to equalizer 54. Hybrid 51 is designed to separate the transmit signal on line 49 from the received signal on line 52. Equalizer 54 operates conventionally and supplies the received signal on line 56 to Viterbi decoder 57. Viterbi decoder 57 decodes the trellis coding applied by trellis encoder 46 by slicing the received data and generating a constellation signal point. The output of Viterbi decoder 57 is supplied on line 58 to demapper 59. Demapper 59 determines the bit combination belonging to the signal point supplied by Viterbi Decoder 57 in order to recover the transmitted data and provides the data on line 61 to optional descrambler 62. If descrambler 62 is not employed, demapper 59 sends the data on line 61 to switch 66.

In a manner similar to that of switch 37, switch 66 is controlled by Reed-Solomon decoder logic 30. Reed-Solomon decoder logic 30 controls switch 66 in such a way as to either send the customer data on line 69 to RS decoder 71 or to output training data on line 68.

Reed-Solomon decoder logic 30 is designed to control switch 66 in such a way as to allow RS decoder 71 to send customer data to line 72 at a known time after receipt of a time stamp, such as a Tomlinson exchange frame. Reed-Solomon decoder logic 30 includes counter 35 to enable the counting of baud, or timing, cycles after receipt of the aforementioned time stamp. The timing of Reed-Solomon encoder logic will be discussed in detail with respect to FIG. 4.

Figure 4:
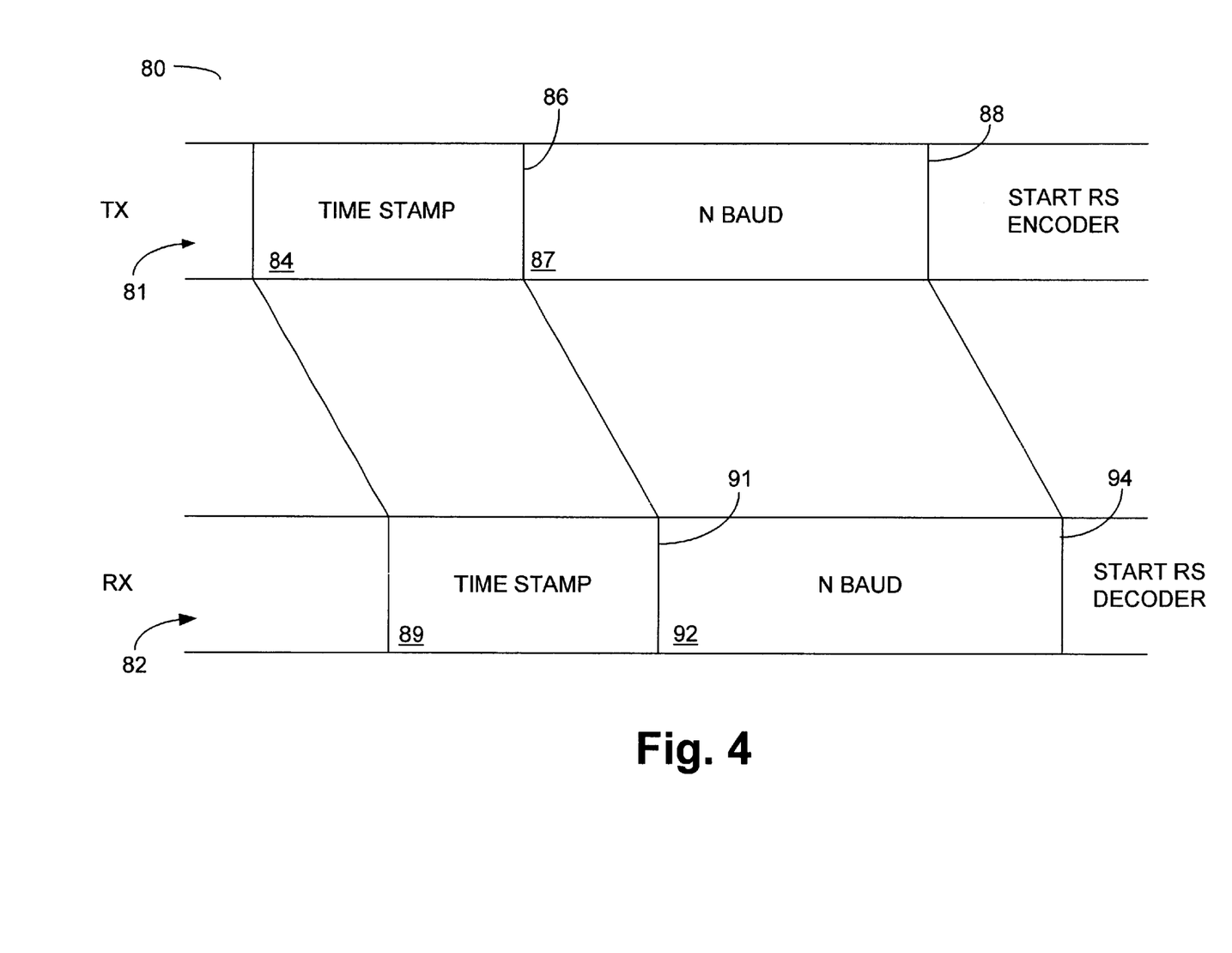
FIG. 4 is a timing diagram illustrating the operation of the Reed-Solomon encoder and decoder logic of FIG. 2.

Referring now to FIG. 4, shown is timing diagram 80 illustrating the operation of the Reed-Solomon encoding and decoding logic 30 of the present invention. Transmit bit stream 81 includes a pre-existing time stamp 84, which illustratively can be a Tomlinson coefficient exchange frame. At the end of a training phase, as is known in the art, a series of information is exchanged. This series of information can include options, status and Tomlinson coefficients. This exchange is handled within symbol boundaries, and therefore can serve as an exact time stamp. At time 86, ie., the end of time stamp frame 84, Reed-Solomon encoder logic 30, which includes counter 35, is enabled and begins counting a fixed, or N, number of baud, or timing, cycles illustrated as frame 87. Once a predetermined number of cycles have elapsed, i.e., time 88, Reed-Solomon encoder 32 is started, the operation of which was described with reference to FIG. 3.

Similarly, receive bit stream 82 includes a similar pre-existing time stamp 89, or in this preferred embodiment, a Tomlinson coefficient exchange frame. At time 91, i.e., the end of time stamp frame 89, Reed-Solomon decoder logic 30, which includes a counter 35, is enabled and begins counting a fixed, or N, number of baud, or timing, cycles illustrated as frame 92. Once a predetermined number of cycles corresponding to the number of timing cycles illustrated as frame 87 in the transmit bit stream have elapsed, i.e., time 94, Reed-Solomon decoder 71 is started, the operation of which was described with reference to FIG. 3. This allows both the transmitter and receiver to achieve timing synchronization of their respective Reed-Solomon encoder and decoder by counting the same number of timing cycles with respect to the known time stamp period, i.e., 84 and 89, in this example the Tomlinson coefficient exchange frame. Because the logic in both the transmitting device and the receiving device begins counting from a fixed timing reference, the present invention allows both the transmitting device and the receiving device to maintain synchronization even in the event of a signal interruption.

In an alternative embodiment, the logic of the present invention may also be configured to cause a transmitter to send a data pattern that allows a receiver to synchronize both the bits in a byte and also to find the first byte in a Reed-Solomon frame. Once the synchronization is complete the receiver will stay in synchronization indefinitely. For example, the following bit pattern could be sent by a transmitter:

0x01, 0x01, 0x01, . . . , 0x01, 0xfe the 0x01 's would be used for byte synchronization and the 0xfe could be used to indicate the start of a RS frame.

Figure 5:
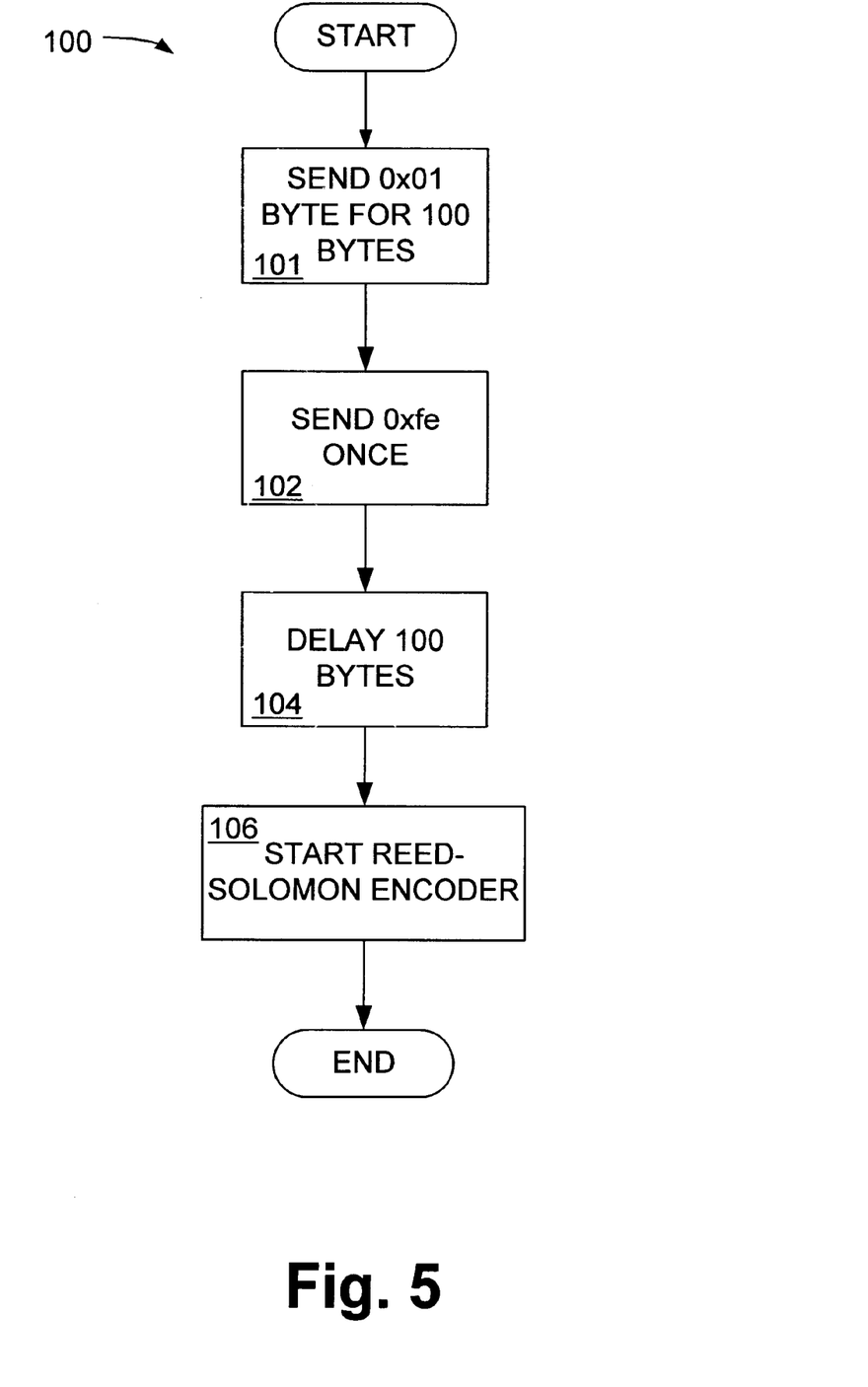
FIG. 5 is a flow chart illustrating the operation of an alternate embodiment of the frameless Reed-Solomon encoder logic of FIG. 2 as applied to a transmitter synchronization sequence.

FIG. 5 is a flow chart 100 illustrating an alternative embodiment of the operation of the frameless Reed-Solomon encoder logic of FIG. 2 as applied to a transmitter synchronization sequence.

In block 101, transmitter 22 sends the bit pattern 0x01 for 100 bytes. At the conclusion of the $100^{th}$ byte, the transmitter 22, in block 102, sends the bit 0xfe a single time. The 0xfe bit signifies the start of the byte counter (counter 35 of FIG. 3) that will be used to delay the activation of the Reed-Solomon encoder for an appropriate number of bytes corresponding to the delay in the receiver that will be described with reference to FIG. 6.

In block 104, the transmitter will then delay by 100 bytes the activation of the Reed-Solomon encoder. This 100 byte delay is random and can be any fixed N byte delay so as to allow the receiver to detect the 0xfe bit and begin it's delay counter. The N byte delay described herein achieves the same result as that of the N baud delay illustrated as frame 87 in FIG. 4. In block 106, Reed-Solomon encoder 32 (FIG. 3) is started signifying the end of the transmitter synchronization sequence.

Figure 6:
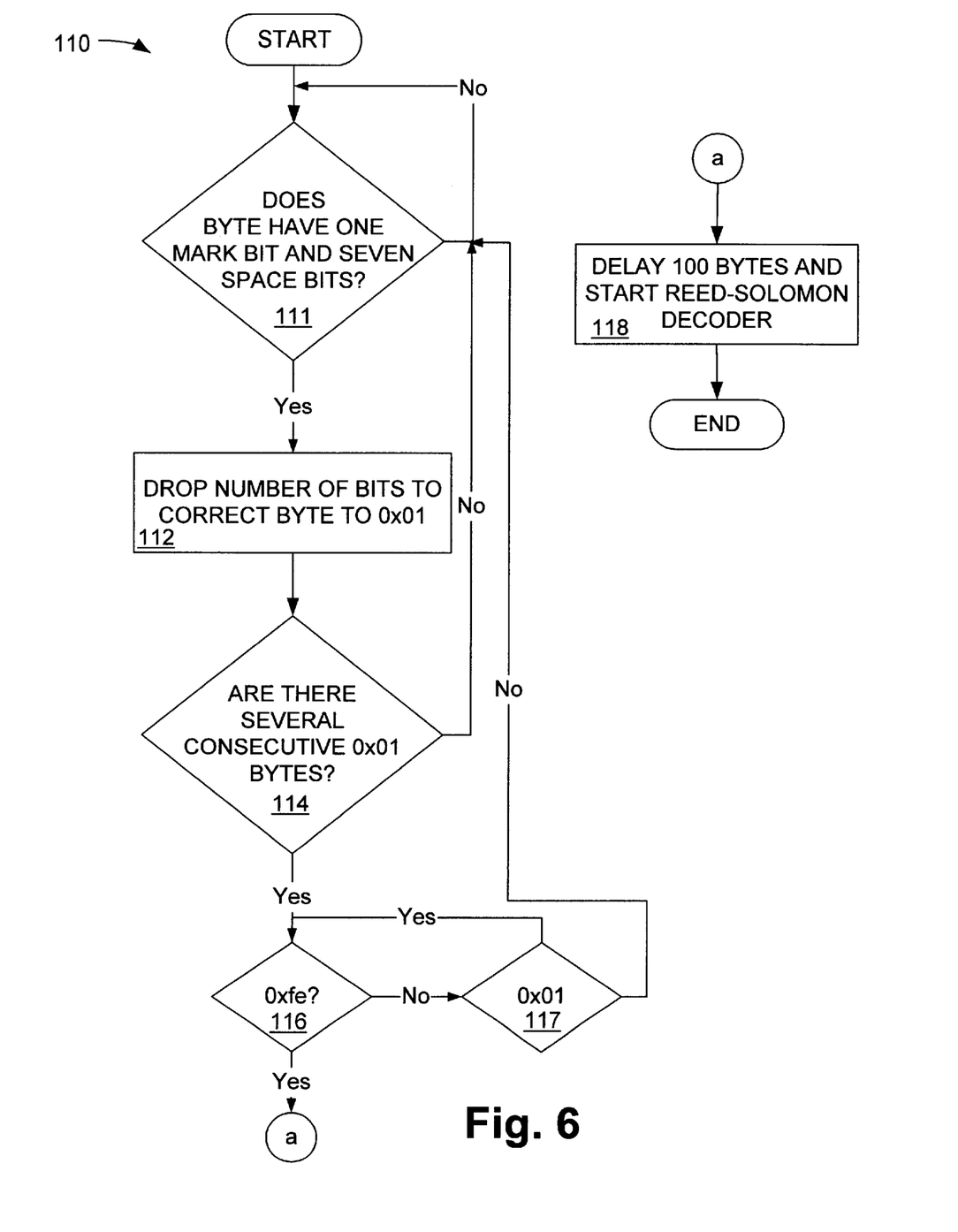
FIG. 6 is a flow chart illustrating the operation of an alternate embodiment of the frameless Reed-Solomon decoder logic of FIG. 2 as applied to a receiver synchronization sequence.

FIG. 6 is a flow chart 110 illustrating an alternative embodiment of the operation of the frameless Reed-Solomon decoder logic of FIG. 2 as applied to a receiver synchronization sequence.

In block 111, the receiver 23 queries whether the received byte contains a mark bit and seven space bits. A 0x01 pattern allows the receiver to lock it's byte data to the byte data of the transmitter. If the byte does not contain a mark bit and seven space bits then the operation of block 111 is repeated. If the byte does contain a mark bit and seven space bits, then in block 112 the number of bits is dropped in order to correct the byte received to 0x01.

In block 114, it is determined whether receiver 23 has received several consecutive 0x01 bytes. If not, then the operation of block 111 is repeated. If several consecutive 0x01 bytes have been detected, then in block 116, it is determined whether any of those bytes received is the 0xfe byte transmitted in step 102 of FIG. 5 signifying the start of the delay counter (counter 35 in FIG. 3) used to cooperatively delay the activation of the Reed-Solomon coding in both the transmitter and receiver.

If the 0xfe byte has not been received then in block 117 it is determined whether a 0x01 byte was received. If not, then the operation of block 111 is repeated. If in block 117 it is determined that a 0x01 byte was received, then block 116 will again determine whether a 0xfe byte has been received.

If a 0xfe byte was received, then in block 118 the receiver 23 will delay 100 bytes and then start the Reed-Solomon decoder 71. The 100 byte delay corresponds to the 100 byte delay in block 104 of FIG. 5, in which the transmitter waited 100 bytes before activating the Reed-Solomon encoder.

While the foregoing illustrates a delay of 100 bytes prior to the start of the Reed-Solomon encoder and decoder, it will be appreciated by those skilled in the art that other delay durations are possible without departing from the present invention.

To increase immunity to errors, the transmit sequence may be modified to include several synchronization words. For example, it is possible to sent eight synchronization words, each separated by 10 bytes. In order to maximize the distance between the synchronization words and the bit synchronization pattern (0x01), the synchronization words can be for example, but not limited to 0xfe, 0xfd, 0xfb, 0xf7, 0xef, 0xdf, 0xbf, and 0x7f, each having only one zero. The receiver can synchronize on any two or three of the synchronization words and the Reed-Solomon encoder could be started a fixed number of bytes after the last synchronization byte in accordance with that described in FIGS. 4, 5, and 6.

It will be obvious to those skilled in the art that many modifications and variations may be made to the preferred embodiments of the present invention, as set forth above, without departing substantially from the principles of the present invention. For example, any symbol specific time stamp can be used as a reference point in time for the logic and counter of the present invention. All such modifications and variations are intended to be included herein within the scope of the present invention, as defined in the claims that follow.

What is claimed is:

1. A system for data communications, comprising:
    a transmitter comprising:
        a Reed-Solomon (RS) encoder;
        a first counter responsive to a particular signal and configured to count a number of timing cycles prior to enabling said RS encoder to encode data, said first counter allowing the RS encoder to engage without the use of framing bits by counting a number of timing cycles prior to encoding;
        a mapper designed to map said encoded data into a signal space constellation;
        a transmit filter designed to transmit a signal representative of said signal space constellation;
    a receiver comprising:
        an equalizer;
        a demapper designed to recover said data from said signal;
        a RS decoder configured to decode said data without the use of framing bits; and
        a second counter responsive to said particular signal and configured to count a number of timing cycles prior to enabling said RS decoder to decode said data, said second counter allowing the RS decoder to engage without the use of framing bits by counting the number of timing cycles prior to decoding.

2. The system of claim 1, wherein said first counter and said RS encoder allow the system to maintain synchronization in the event of a signal interruption.

3. The system of claim 1, wherein said RS encoder is configured to begin operation at the end of a determinable period.

4. The system of claim 3, wherein said determinable period comprises a number of timing cycles, said determinable period initiated when said transmitter sends said particular signal.

5. A system for transmitting a frameless Reed-Solomon (RS) code, comprising:
    a RS encoder;
    a counter responsive to a particular signal and configured to count a number of timing cycles prior to enabling said RS encoder to encode data, said first counter allowing the RS encoder to engage without the use of framing bits by counting the number of timing cycles prior to encoding;
    a mapper designed to map said encoded data into a signal space constellation; and
    a transmit filter designed to transmit a signal representative of said signal space constellation.

6. The system of claim 5, wherein said counter is configured to begin its operation at the end of a determinable period.

7. The system of claim 5, wherein said count is initiated by said particular signal.

8. A system for receiving a frameless Reed-Solomon (RS) code, comprising:
    an equalizer;
    a demapper designed to recover data from said signal space constellation;
    a RS decoder configured to decode said data without the use of framing bits; and
    a counter responsive to a particular signal and configured to count a number of timing cycles prior to enabling said RS decoder to decode said encoded data, said counter allowing the RS decoder to engage without the use of framing bits by counting the number of timing cycles prior to decoding.

9. The system of claim 8, wherein said count is initiated by the receipt of a particular signal.

10. A method for data communications, comprising the steps of:
    supplying data to a Reed-Solomon (RS) encoder;
    counting a number of timing cycles prior to engaging said RS encoder in order to encode said data without the use of framing bits;
    mapping said data into a signal space constellation;
    transmitting a signal representative of said signal space constellation;
    receiving said signal;

equalizing said received signal;

recovering said encoded data from said equalized signal;

counting the number of timing cycles prior to engaging a RS decoder in order to decode said data without the use of framing bits; and decoding said encoded data using said RS decoder.

11. The method of claim 10, wherein operation of said RS encoder is begun at the end of a determinable period.

12. The method of claim 11, wherein said determinable period comprises a number of timing cycles, said determinable period initiated by a particular signal.

13. A method for transmitting a frameless Reed-Solomon (RS) code, comprising the steps of:

supplying data to a RS encoder;

counting a number of timing cycles prior to encoding said data;

mapping said encoded data into a signal space constellation; and transmitting a signal representative of said signal space constellation.

14. The method of claim 13, wherein operation of said RS encoder is begun at the end of a determinable period.

15. The method of claim 14, wherein said determinable period comprises a number of timing cycles, said determinable period initiated by a particular signal.

16. A method for receiving a frameless Reed-Solomon (RS) code, comprising the steps of:

receiving a signal;

equalizing said received signal;

recovering data from said equalized signal;

counting a number of timing cycles prior to engaging a RS decoder in order to decode said data without the use of framing bits; and decoding said data using said RS decoder.

17. The method of claim 16, wherein said counting is initiated by the receipt of a particular signal.

18. A computer readable medium having a program for data communications, the medium comprising:

means for supplying data to a Reed-Solomon (RS) encoder;

means for counting a number of timing cycles prior to engaging said RS encoder in order to encode said data without the use of framing bits;

means for mapping said encoded data into a signal space constellation;

means for transmitting a signal representative of said signal space constellation;

means for receiving said signal representative of said signal space constellation;

means for equalizing said received signal;

means for recovering said data from said equalized signal;

means for counting a number of timing cycles prior to engaging a RS decoder in order to decode said data without the use of framing bits; and means for decoding said data using said RS decoder.

19. The program of claim 18, wherein said RS encoder is actuated at the end of a determinable period.

20. The program of claim 19, wherein said determinable period comprises a number of timing cycles, said determinable period initiated by a particular signal.

21. A computer readable medium having a program for transmitting a frameless Reed-Solomon (RS) code, the program comprising:

means for supplying data to a RS encoder;

means for counting a number of timing cycles prior to encoding said data;

means for mapping said data into a signal space constellation; and means for transmitting a signal representative of said signal space constellation.

22. The program of claim 21, wherein said RS encoder is actuated at the end of a determinable period.

23. The program of claim 22, wherein said determinable period comprises a number of timing cycles, said determinable period initiated by a particular signal.

24. A computer readable medium having a program for receiving a frameless Reed-Solomon (RS) code, the program comprising:

means for receiving a signal;

means for equalizing said received signal;

means for recovering data from said equalized signal;

means for counting a number of timing cycles prior to engaging a RS decoder in order to decode said data without the use of framing bits; and means for decoding said data using said RS decoder.

25. The method of claim 24, wherein said means for counting is initiated by the receipt of a particular signal.

* * * * *